United States Patent

Clark

[15] 3,649,758

[45] Mar. 14, 1972

[54] FRAME SYNCHRONIZATION SYSTEM

[72] Inventor: James M. Clark, Cedar Grove, N.J.

[73] Assignee: International Telephone and Telegraph Corporation, Nutley, N.J.

[22] Filed: July 6, 1970

[21] Appl. No.: 52,354

[52] U.S. Cl. ....................................178/69.5 R, 179/15 BS

[51] Int. Cl. ............................................................H04l 7/00

[58] Field of Search...............178/69.5; 179/15 BS; 328/119; 325/52

[56] References Cited

UNITED STATES PATENTS 3,317,669 5/1967 Ohnsorge..............................178/69.5
3,484,555 12/1969 Ching et al............................178/69.5
3,483,474 12/1969 Meranda...............................178/69.5
3,526,719 9/1970 Puente et al.........................179/15 BS

*Primary Examiner*—Richard Murray
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A binary information signal having a given bit rate and either one of two different synchronization codes and two local binary synchronization reference signals are applied to a digital comparison circuit, the two output signals indicating a match or mismatch between the successive adjacent bits of the information signal and the associated one of the reference signals. The two output signals are OR-ed and AND-ed with these functions being applied to a common decision circuit having a decision level resulting in a "1" output when the decision level is not exceeded and a "0" output when the decision level is exceeded. Search logic operates on the above AND function, or a separately produced AND function, of the two output signals and cooperates with the output of the decision circuit to achieve synchronization to either of the two synchronization code patterns. The search logic is described as employing the immediate response circuit and technique, the look-ahead technique employing one shift register and the look-ahead technique employing two shift registers.

14 Claims, 5 Drawing Figures

INVENTOR
JAMES M. CLARK
BY Alfred C. Hill
AGENT

INVENTOR
JAMES M. CLARK
BY Alfred C. Hill
AGENT

INVENTOR
JAMES M. CLARK
BY
Alfred C. Hill
AGENT

INVENTOR
JAMES M. CLARK
BY
Alfred C. Hill
AGENT

FRAME SYNCHRONIZATION SYSTEM

BACKGROUND OF THE INVENTION

This invention relates to digital communication systems, such as time division digital demultiplexers including pulse code modulation (PCM) equipment, and more particularly to frame synchronization systems employed therein.

Before proceeding, it should be noted that as employed herein the term "frame" is defined as one of a series of contingent periods of time during which there are data bits plus one or more synchronization bits with no data bits being present between synchronization bits. In addition, a "multiframe" is a period of time including one or more "frames," and sufficient to include one entire synchronization pattern.

In general, the bits of the synchronization codes vary from one frame to another within the multiframe, but are duplicated from one multiframe to the next.

There are two general types of synchronization codes to which the present invention will respond. First, a distributed-type synchronization code including one bit per frame and usually two or more frames per multiframe. For instance, such a code would include "1" in one frame of the multiframe and a "0" in the other frame of the multi-frame. Second, a lumped (character) type synchronization code including more than a few bits (one character) per frame, but one frame is a multiframe.

The general problem is to establish and maintain frame synchronization of a digital communication receiver in the presence of noise or bit errors. A frame synchronization circuit controls the timing counters of a digital demultiplexer to make the counter timing synchronous with the format of the data received. This circuit has two primary functions: (1) to sense when synchronization is lost and (2) to change the phase of the counter, as required, until synchronization is achieved. A reference synchronization pattern generated from the counters is compared with the incoming signal to detect whether or not the counters are synchronized. If sync is lost, the equipment will switch to a search mode. In the search mode, the phase of the counters are changed until it is detected that synchronism is achieved after which the frame synchronization system will change to a sense mode to detect a subsequent loss of synchronization.

With the distributed-type synchronization code, the usual procedure is to sample one bit of each frame, and advance the phase of the counters by one bit each time a mismatch is sampled, except when an averaging or integrating circuit, which responds to the average rate of mismatches, has an output exceeding a certain threshold. The phase of the counters is usually advanced by deleting one clock pulse at the input to the counters, thus, causing the counters to halt momentarily. The threshold of the decision or integrating circuit will be exceeded when the mismatch rate is low, and will remain exceeded when the correct phase is reached. This prevents further halting.

When the lumped-type synchronization code is used, the input signal is shifted down a shift register, one character long. When the code at the shift register matches the expected synchronization code, the counters are reset to a count corresponding to the normal time of arrival of the synchronization character. If the next synchronization code does not arrive as expected, shifting and comparing is repeated as before.

As may be determined from the foregoing, conventional frame synchronization circuits for the distributed-type synchronization code do not respond immediately, that is, within one bit time of the digital input because the action centers on the charge and discharge of a capacitor whose associated time constant is longer than one bit time. That is, for the conventional circuit, when an incoming bit is compared to the local synchronization reference signal and it does not match, the next bit to be examined is the next bit of the next frame.

A first copending application of J. M. Clark, Ser. No. 781,181, filed Dec. 4, 1968, now U.S. Pat. No. 3,597,539, discloses an embodiment of a frame synchronization system employing an immediate response technique operating on a distributed-type synchronization code that will reduce the search time relative to the search time employed by the conventional synchronization systems mentioned hereinabove operating on the same type of synchronization code.

A second copending application of J. M. Clark, Ser. No. 780,981, filed Dec. 4, 1968, now U.S. Pat. No. 3,594,502, discloses an embodiment of a frame synchronization system employing a look-ahead technique utilizing a single shift register operating on a distributed-type synchronization code that will reduce the search time a further amount relative to said first copending application operating on the same type of synchronization code.

A third copending application of J. M. Clark, Ser. No. 66,396, filed Aug. 24, 1970, discloses an embodiment of a frame synchronization system employing the look-ahead technique utilizing two shift registers of equal length for operating on a distributed type synchronization code.

SUMMARY OF THE INVENTION

An object of the present invention is to provide still another frame synchronization system in addition to said first, second and third copending applications.

Another object of this invention is the provision of a frame synchronization system which synchronizes on either of two different synchronization code patterns of either the distributed or lumped type.

Still another object of this invention is the provision of a frame synchronization system capable of synchronizing on either of two different synchronization code patterns which may be employed to detect information conveyed by utilizing the two synchronization code patterns to transmit information.

A further object of this invention is the provision of a frame synchronization system operating to synchronize on either of two synchronization code patterns which may be employed in a fault-detecting and location system, wherein any repeater which detects that neither sync pattern is present at its input will indicate the fault and a different synchronization code pattern from that normally employed so that subsequent repeaters can properly operate and detect synchronization, thus not indicating a fault, and yet at the terminal end of the system it will be recognized that a fault has occurred by detecting that the normal sync pattern is not being received.

A feature of this invention is to provide a frame synchronization system comprising a source of binary information signal having a given bit rate and containing either one of two different synchronization components; first means to produce a plurality of timing signals; second means coupled to the source and the first means to examine successive bits of the information signal to recognize either of the synchronization components and produce at each examination a first resultant output signal and a second resultant output signal; and third means coupled to the second means and the first means responsive to the first and second resultant output signals to provide a control signal for timing adjustment of the timing signals of the first means when the first and second resultant output signals indicate an out-of-synchronization condition until synchronization is achieved.

Another feature of this invention is the provision in the frame synchronization system of this invention of the first means further producing a first local binary synchronization reference signal for one of the synchronization components, and a second local binary synchronization reference signal for the other of the synchronization components; and the second means including a digital comparison means coupled to the source and the first means to compare the binary condition of successive bits of the information signal and the binary condition of the first reference signal and produce the first resultant signal and to compare the binary condition of successive bits of the information signal and the binary condition of the second reference signal and produce the second resultant signal.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENTS

Figure 1:
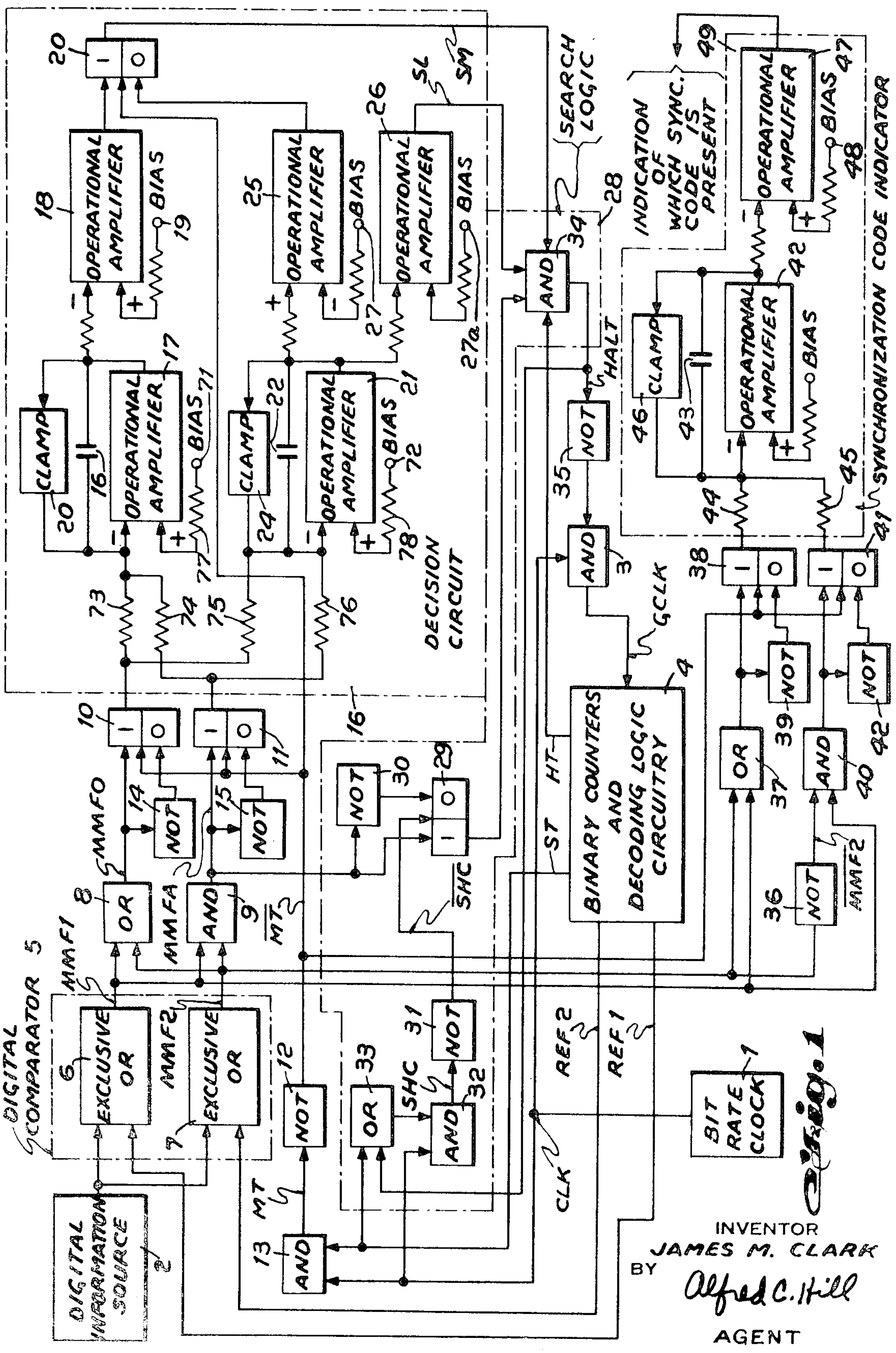
FIG. 1 is a block diagram of one embodiment of the frame synchronization system in accordance with the principles of this invention.

As pointed out hereinabove, there are two general types of synchronization codes with which the system of this invention will operate. The system of this invention will first be completely described employing a synchronization component or code pattern of the distributed type with a first synchronization pattern being 1,0,1,0 in each multiframe and the second synchronization code pattern being 1,1,0,0 in each multiframe.

In the various figures to be described herein, like circuits will be identified by the same reference character and will only be completely described the first time it occurs in the following description it being understood that it will operate in the same manner for the further embodiments of the invention.

Referring to FIG. 1, there is illustrated therein a block diagram of one embodiment of the frame synchronization system of this invention. Clock 1 produces clock pulses at the bit rate of the digital (binary) information signal from source 2 and is applied through AND 3 to binary counters and decoding logic circuitry 4 to produce various timing signals necessary for the operation of the frame synchronization system, as well as the timing signals necessary for other functions, such as to demultiplex the multiplexed signal received from source 2. For purposes of explanation, it will be assumed that the frame rate of the information signal is 8 kc. and that the first local synchronization reference signal referred to as REF 1 is a 4 kc. square wave having binary conditions corresponding to the first synchronization code pattern 1,0,1,0 and that the second synchronization reference signal referred to as REF 2 is a 2 kc. square wave signal having the proper binary conditions for the second synchronization code pattern 1,1,0,0. In general, the two codes must have the property that a comparison of the codes for any relative phase will always result in 50 percent of the bits matching and 50 percent mismatching. Other timing signals generated by circuitry 4 are the synchronization bit time signal ST having a constant width of 1 clock period and the halt-time signal HT having a varying width equal to the width of the HALT pulse plus the width of 1 clock period.

The need for the halt-time signal HT is to prevent the frame synchronization system from locking in an unsynchronized and stationary condition upon power turn-on, since components 10, 11, 16 and 29 could otherwise assume a combination of states that would stop the counters of circuitry 4. The lack of timing signals would prevent flip-flops 10, 11 and 29 from leaving the above combination of states. By utilizing the signal HT, the counters of circuitry 4 are allowed to stop only when timing signals are available to flip-flops 10, 11 and 29.

The information signal from source 2 and the two local synchronization reference signals REF 1 and REF 2 from circuitry 4 are applied to digital comparator 5 in the form of EXCLUSIVE OR-gates 6 and 7 which compare the binary conditions of successive bits of the information signal and the REF 1 and REF 2 signals. Gate 6 will produce a first resultant output signal MMF 1 which indicates match and mismatch between the binary conditions of the two input signals applied thereto and gate 7 will produce a second resultant output signal MMF 2 which indicates match and mismatch between the binary conditions of the two input signals applied thereto.

An OR-function MMF0 of the signals MMF1 and MMF2 are produced in OR 8 and an AND-function MMFA of the signals MMF1 and MMF2 are produced in AND 9. The MMF0 signal is applied directly to flip-flop 10 and the MMFA signal is applied directly to flip-flop 11. Both flip-flops 10 and 11 are triggered by the inverse of the MT ($\overline{MT}$) signal at the output of NOT 12 which receives its input from AND 13. AND 13 has its inputs coupled to clock 1 and the ST signal from circuitry 4. Flip-flops 10 and 11 operate to sample their respective inputs MMF0 and MMFA on the leading edge of the inverted MT signal and the state of these flip flops 10 and 11 will change on the trailing edge of $\overline{MT}$ signal. The output from OR 8 and AND 9 is also coupled to NOT 14 and NOT 15, respectively. Thus, when the signals at the output of OR 8 and AND 9 are "0," the output of NOT 14 and NOT 15 will be a "1" which will be sampled at the leading edge of the $\overline{MT}$ signal and at the trailing edge thereof will cause flip-flops 10 and 11 to change their states, thus, producing on their "1" output a binary "0" condition.

The outputs from flip-flops 10 and 11 are coupled through equal valued resistors 19 and 23 to a common algebraic combining point which is the input of decision circuit 16. Circuit 16 determines whether the samples presented thereto indicate a synchronized or out-of-synchronization condition and provides a different appropriate output for each of these conditions.

Decision circuit 16 may take the various forms described in copending applications of J. M. Clark, Ser. No. 36,744, filed May 13, 1970 and Ser. No. 66,258, filed Aug. 24, 1970. As illustrated in FIG. 1 decision circuit 16 includes a sense integrator including operational amplifier 17, capacitor 18, resistors 73, 74 and 77 and clamp 20. The time constant for this sense integrator is selected by selecting the values of capacitor 18 and resistors 73 and 74 to have a long time constant so as not to respond to fades or momentarily errors in the received data which would operate, without this long time constant, to cause the system to go out of synchronization when actually it is still in synchronization. The threshold probability of this circuit is established by bias voltage 71. The threshold probability is the input probability which causes no average change to the output. The output of operational amplifier 17 is coupled to an amplitude comparator in the form of operational amplifier 18 having a bias applied to terminal 19 which establishes a decision level for this portion of circuit 16. The output of amplifier 18 is coupled to the "1" input of mode flip-flop 20 which is triggered by the $\overline{MT}$ signal from NOT 12. In addition, decision circuit 16 includes a search integrator incorporating operational amplifier 21, capacitor 22, resistors 75, 76 and 78 and clamp 24. This search integrator will have a short time constant as established by the values of capacitor 22 and resistors 75 and 76 to provide rapid acquisition of synchronization once synchronization is lost. The threshold probability of this circuit is established by bias 72. The output from amplifier 21 is coupled to an amplitude comparator in the form of operational amplifier 25 having a decision level for this portion of circuit 16 provided by the bias at terminal 27 and also to an amplitude comparator in the form of operational amplifier 26 having a decision level for this portion of circuit 16 provided by the bias at terminal 27*a*.

The operation of decision circuit 16 is as follows. In an out-of-synchronization condition both MMF1 and MMF2 will have a relatively large number of mismatches represented by binary "1." Typically, each signal will be "1" 50 percent of the time. Thus, both MMF0 and MMFA will have a high average value which when algebraically combined in resistors 73 and 74 and resistors 75 and 76 presents a high average value to the inverting inputs of both amplifiers 17 and 21. This results in a lower value at the output of amplifiers 17 and 21, if the average value at the inverting inputs exceeds the bias applied to the noninverting inputs thereof. The value from amplifier 17 eventually becomes less than the bias at terminal 19. This results in a high output from amplifier 18 which triggers mode flip-flop 20 to have a binary "1" at its "1" output. Thus, signal SM will be a binary "1." The low value from amplifier 21 is coupled to the noninverting input of amplifier 25 which in conjunction with the bias on terminal 27 produces a low output for coupling to the "0" input of flip-flop 20 and has no effect thereon. Additionally, the low value from amplifier 21 is coupled to the inverting input of amplifier 26 resulting, in conjunction with the bias on terminal 27*a*, in a high or binary "1" output therefrom. Thus, signal SL will be a binary "1."

In the case of the system being synchronized to either of the two code patterns, either MMF1 or MMF2 will be predominately binary "0" representing a match (synchronization) and the other of MMF1 or MMF2 will be randomly "0" or "1," representing random matches and mismatches with 50 percent probability each (out-of-synchronization). In either situation, MMFA will be predominately low and MMF0 will be high 50 percent of the time. When these two signals are algebraically combined on resistors 73 and 74 and resistors 75 and 76 there is a resultant average value equal to 25 percent of the full amplitude applied to the inverting input of both amplifiers 17 and 21 which results in a high value at the outputs of amplifiers 17 and 21, because the average value of the inverting input is less than the bias applied to the noninverting inputs thereof. The high value from amplifier 17 results in a low output from amplifier 18 which has no effect on flip-flop 20. The high value from amplifier 21 is coupled to the noninverting input of amplifier 25 which in conjunction with the bias on terminal 27 produces a high output for coupling to the "0" input of flip-flop 20 which resets flip-flop 20, if it is not already reset, to produce a binary "0" (signal SM) at the "1" output thereof. Additionally, the high value from amplifier 21 is coupled to the inverting input of amplifier 26 resulting, in conjunction with the bias on terminal 27*a*, in a low or binary "0" output therefrom and, thus, a binary "0" for signal SL.

The foregoing description of the operation of decision circuit 16, particularly with respect to the random nature of the sync signals, is clarified in the following TABLE.

Average sum = ½ for out of sync and

Average sum = 0 for in sync that is, one-half less than the average SUM for this framing circuit mentioned above.

If the two resistors 73 and 74 or resistors 75 and 76 coupling MMFA and MMF0 to the same operational amplifier are equal, the same results will be obtained if MMF1 and MMF2 are instead coupled to the operational amplifier. However, by using MMFA and MMF0, the two coupling resistors 73 and 74 or 75 and 76 can be made different in value if desired, without causing the framing circuit to favor one code (that is, to synchronize more easily on one sync code than the other).

As pointed out hereinabove, the MMF0 and MMFA functions of the two mismatch functions MMF1 and MMF2 are used to operate decision circuit 16. Only the MMFA output of AND 9 is used to operate the search logic 28, so that halting will occur only when both types of mismatches occur simultaneously; namely, when MMF1 = "1" and MMF2 = "1." Thus, regardless of which synchronization code pattern is received, synchronization will not be lost when there are no errors. MMF0 and MMFA will differ and will cancel when only one of MMF1 and MMF2 indicates a mismatch; that is, when the comparisons of the two reference signals differ. This difference will be for a fixed percentage of the time, depending only on the synchronization code patterns used and, typically one-half of the time. When MMF1 = MMF2, then MMF0 = MMFA, and the operation of the decision circuit 16 will satisfy both sync codes. It is typical that MMF0 is unequal to MMFA one-half the time, and the affect of this on the integrator may be offset by changing the biases on terminals 71 and 72 (the threshold probability) to a new bias which is equal to one half (old bias + 50 percent). This is because at threshold, one-half the time the input will be at the threshold probability (where the old bias was set) and one-half the time MMF0 will not equal MMFA, and the input will be equivalent to a 50 percent probability. Placing the new bias half way between these two values will balance the integrator for an input at the threshold probability.

As pointed out hereinabove, the MMFA output of AND 9 is coupled to logic circuit 28 which includes flip-flop 29 to which the MMFA signal is directly coupled and through NOT 30 as illustrated with the triggering pulses therefore being provided from NOT 31, AND 32 and OR 33. The input to OR 33 is the ST timing signal from circuitry 4 and the output of AND 34 which is part of search logic 28 and whose operation will be explained hereinbelow. The inputs to AND 32 are the output from OR 33 and the output from clock 1, thereby, generating through NOT 31 an inverted SHC ($\overline{SHC}$) trigger signal for flip-flop 29. AND 34 determines whether a HALT signal

| MMF1 | MMF2 | MMF0 | MMFA | SUM | $P_0$ | $P_1$ | $P_2$ | OR 37 | AND 40 | Sum of OR 37 and AND 40 |
|---|---|---|---|---|---|---|---|---|---|---|
| 0 | 0 | 0 | 0 | 0 | ¼ | ½ | ½ | 1 | 0 | 1 |
| 0 | 1 | 1 | 0 | 1 | ¼ | ½ | 0 | 0 | 0 | 0 |
| 1 | 0 | 1 | 0 | 1 | ¼ | 0 | ½ | 1 | 1 | 2 |
| 1 | 1 | 1 | 1 | 2 | ¼ | 0 | 0 | 1 | 0 | 1 |

where SUM = sum of MMF1 and MMF2 = sum of MMF0 and MMFA $P_0$ = probability when out of sync $P_1$ = probability when sync'd to code 1

$P_2$ = probability when sync'd to code 2

When out of sync, average SUM = 1.

When sync'd to code 1, average SUM = ½.

When sync'd to code 2, average SUM = ½.

For example, for the average value of the sum of MMF0 and MMFA when sync'd to code 1, columns "SUM" and "$P_1$" of the Table are used:

$$\text{Average SUM} = (0\times\tfrac{1}{2})+(1\times\tfrac{1}{2})+(1\times 0)+(2\times 0) = 0+\tfrac{1}{2}+0+0=\tfrac{1}{2}$$

The prior art framing circuit, such as said first, second and third copending applications, employing one code the average sum is:

should be coupled through NOT 35 to AND 3 to change the phase of the timing signals at the output of circuitry 4 by momentarily halting the coding of the binary counters. AND 34 receives the SL and SM outputs from decision circuit 16 and the output from flip-flop 29. It should be noted at this point that when decision circuit 16 has voltages from circuits 17 and 21 under the decision levels provided by the biases to amplifiers 18 and 26, a "1" binary output is provided for both the signals SL and SM. When the voltage in the decision circuit 16 is above this decision level, then a "0" binary output is provided for both signals SL and SM. It should also be noted that when a mismatch has been indicated by signal MMFA from AND 9, there will be a "1" at the output of flip-flop 29. Also, the HT timing signal from circuitry 4 is coupled to AND 34 and has the purpose as hereinabove mentioned. Thus, when any of the input signals to AND 34 are in the "0" binary condition there is no HALT signal produced and the counters of circuitry 4 will count without interruption. When all the input signals are in the "1" condition, AND 34 will produce a HALT pulse which through NOT 35 will inhibit the operation of AND 3, thus stopping the counting action of the counters of circuitry 4 and resulting in a shift of the phase or timing of the timing signals produced by circuitry 4. The amount of phase shift is dependent upon how many clock pulses are inhibited.

As mentioned hereinabove, the frame synchronization circuit of this invention can be utilized in a system wherein the two synchronization code patterns are employed to convey intelligence and in communication systems employing a number of repeaters wherein a faulty repeater generates a second synchronization code pattern to which the repeaters between the faulty repeater and the terminal will properly synchronize, but yet will tell the terminal station that a fault has occurred in the transmission system. To enable determination of the information conveyed by the synchronization code patterns, or the presence of a fault in a transmission system, it will be necessary to detect which of the synchronization code patterns the synchronization system is synchronized to, in other words, which synchronization code pattern is present.

To accomplish this, the MMF2 output of gate 7 is coupled through NOT 36 to AND 40 and directly to OR 37. The output of NOT 36 is the inverse of MMF2, namely, $\overline{MMF2}$, that is, a mismatch is a "0" and a match is a "1." The other input to OR 37 is coupled directly from gate 6 and is MMF1. The OR function of MMF1 and $\overline{MMF2}$ from OR 37 is coupled directly to flip-flop 38 and through NOT 39 to flip-flop 38 as illustrated to sample the OR function when triggered by the $\overline{MT}$ signal from NOT 12. The operation of flip-flop 38 and NOT 39 is identical to that described hereinabove with respect to flip-flop 10 and NOT 14. AND 40 is also coupled directly to the output of gate 6 to provide an AND function of MMF1 and $\overline{MMF2}$ which is coupled directly to flip-flop 41 and to NOT 42 to flip-flop 41. The operation of flip-flop 41 is to sample the AND function at the output of AND 40 when triggered by the $\overline{MT}$ signal from NOT 12. The output signals from the "1" output of flip-flops 38 and 41 are combined in resistors 44 and 45 and applied to an integrator including operational amplifier 42, capacitor 43 and clamp 46. The output from amplifier 42 is coupled to an amplitude comparator including operational amplifier 47 which produces an output depending upon which synchronization code pattern the synchronization system is locked to when the system is synchronized, and which produces a random or undetermined output when the system is not synchronized.

Synchronization code indicator 49 operates as follows when the synchronization system is synchronized, that is, when in its sense mode (SM=0). If the system is synchronized to the first code pattern, MMF1 will be predominately binary "0" and MMF2 will be random, with 50 percent binary "1"'s. The AND function of MMF1 and $\overline{MMF2}$ at the output of AND 40 will be a binary "0" and the OR function of MMF1 and $\overline{MMF2}$ at the output of OR 37 will be random with 50 percent binary "1"'s. When the sampled versions of these two functions are algebraically combined in resistors 44 and 45, a low average value will be presented to the inverting input of amplifier 42 resulting in a high output therefrom for application to the inverting input of amplifier 47. This results in a low output from amplifier 47, since the value from amplifier 42 will eventually exceed the bias applied to terminal 48. If the system is synchronized to the second code pattern, MMF1 will be random with 50 percent binary "1"'s and $\overline{MMF2}$ will be predominately binary "0." The AND function of MMF1 and $\overline{MMF2}$ at the output of AND 40 will be random with 50 percent binary "1"'s and the OR function of MMF1 and $\overline{MMF2}$ at the output of OR 37 will be a binary "1." When the sampled versions of these two functions are algebraically combined in resistors 44 and 45, a high average value will be presented to the inverting input of amplifier 42 resulting in a low output therefrom for application to the inverting input of amplifier 47. This results in a high output from amplifier 47, since the value from amplifier 42 will become less than the bias applied to terminal 48. Thus, when a low output occurs from amplifier 47, the system is synchronized to the first code pattern, and when a high output occurs from amplifier 47, the system is synchronized to the second code pattern.

Figures 2, 5:
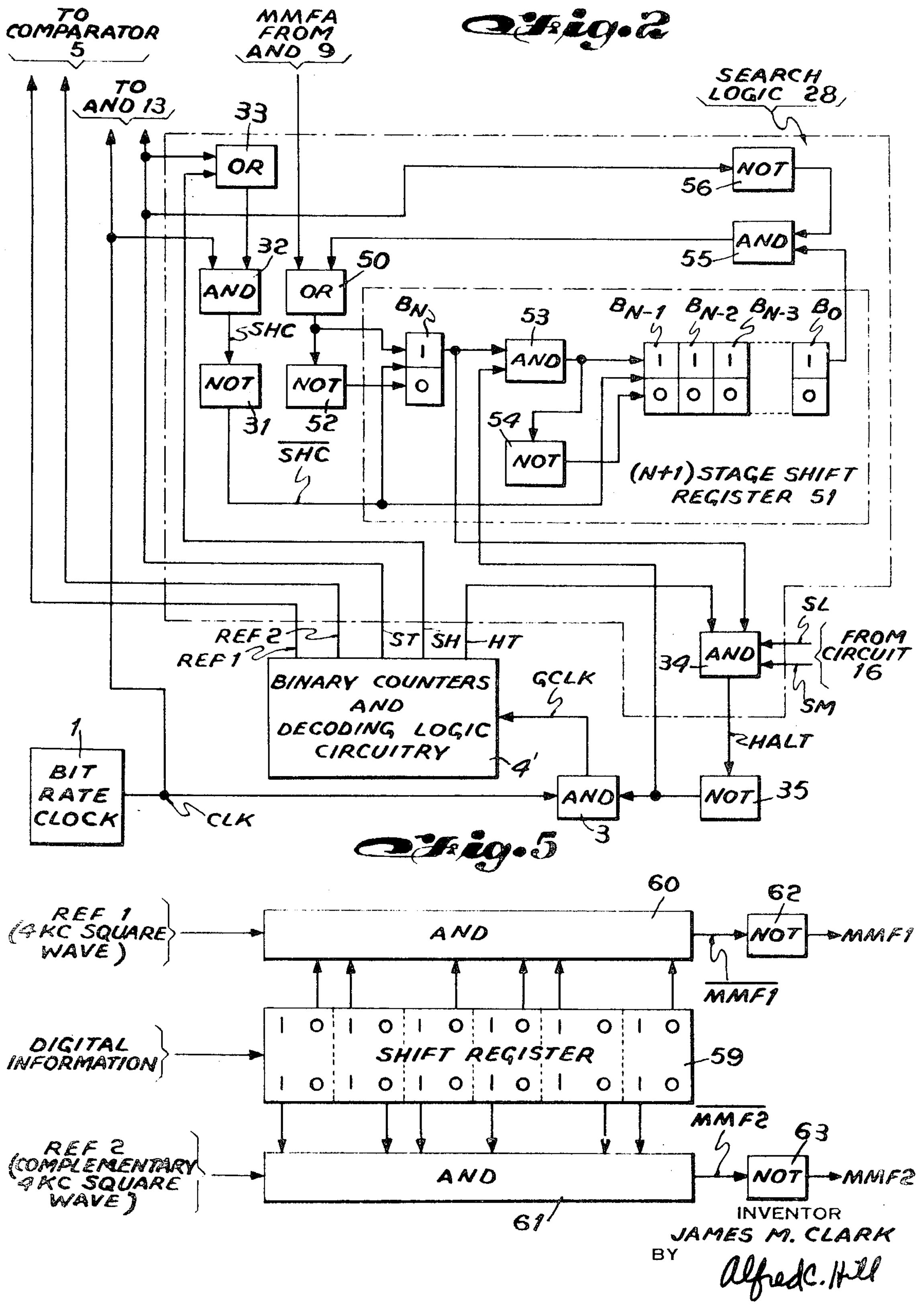
FIG. 2 is a block diagram of another embodiment of the search logic and associated counters and decoding logic circuitry that may be substituted for the search logic and binary counters and decoding logic circuit of FIG. 1.
FIG. 5 is a block diagram of one embodiment of a digital comparator capable of comparing a lumped-type of synchronization code as defined herein that may be substituted for the digital comparator of FIGS. 1 and 3.

The foregoing has been a description of one embodiment of a frame synchronization system in accordance with the principles of the present invention utilizing as the search logic 28 the circuit and technique disclosed in said first copending application. Referring now to FIG. 2, there is illustrated therein search logic 28 to be utilized with the system of FIG. 1 incorporating the circuit described in said second copending application. Clock 1 produces clock pulses at the bit rate of the binary information signal from source 2 which are applied to AND gate 3 and, hence, to binary counters and decoding logic circuitry 4' to produce as described in conjunction with FIG. 1 timing signals necessary in the operation of the frame synchronization system, as well as the timing signals necessary for other functions. Circuitry 4' generates the two reference signals REF 1 and REF 2 together with timing signals ST and HT as described in connection with circuitry 4 of FIG. 1. In addition thereto, a timing signal SH identified as the shift register timing signal is generated by circuitry 4' having a varying width of N clock periods plus the width of the HALT pulse.

The output signal MMFA from AND 9 (FIG. 1) is coupled to OR 50 and, hence, directly to the "1" input of the first flip-flop $B_N$ of the (N+1) stage shift register 51 and through NOT 52 to the "0" input of the same flip-flop. The triggering pulses for flip-flop $B_N$ and the other stages of register 51 $\overline{SHC}$ is provided by NOT 31 and AND 32 which has one input coupled to the output of clock 1 and the other input coupled to the output of OR 33 whose two inputs are coupled to the ST and SH outputs of circuitry 4'.

The output from flip-flop $\overline{B_N}$ is coupled to $\overline{AND}$ 53 whose output is coupled to the next succeeding stage of shift register 51 directly and through NOT 54 is illustrated. In the remainder of register 51, the "1" and "0" outputs of one stage are coupled to the "1" and "0" inputs, respectively, of the succeeding stage. The output of register 51 is coupled to AND 55 with the other input thereof being provided by NOT 56 which is coupled to the ST output of circuitry 4'. Thus, AND 55 will be enabled only when the ST signal is in the "0" binary condition and is disabled when it is in the "1" condition. This permits information relating to all but the first of the (N+1) previous samples of the MMFA signal to be shifted through AND 55 and to the other input of OR 50 to provide a cumulative OR function of the MMFA signal of each frame phase, which in turn, is stored in register 51. The shifting of information from stage $B_N$ to stage $B_0$ and back to stage $B_N$ is accomplished by signal $\overline{SHC}$, which includes N+1+H consecutive clock pulses per frame, where H is the number of clock pulses inhibited by the HALT signal. However, the information is modified during this round trip by gates 50, 53 and 55 as described herein. AND 53 coupled to the output of NOT 35 whose input is coupled to the output of AND 34. Thus, in the absence of a HALT signal at the output of AND 34, AND 53 permits the shifting of information from stage $B_N$ to stage $B_{N-1}$ of shift register 51 and normal counting continues in the counters of circuitry 4'. In this case, signal $\overline{SHC}$ has (N+1) clock pulses per frame, occurring during counts 0–N of the counters of circuitry 4'. Since this is also the number of stages of shift register 51, each bit of information in shift register 51 will be shifted exactly one round trip and will return to its original position each frame period. The information bit originating from and returning to stage $B_S$ is OR-gated by OR 50 with signal MMFA when the counters of circuitry 4' are at count S, where S is any integer from 1 to N. The bit originating from $B_0$, however, is inhibited by AND 55 because signal ST is in the "1" condition when the counters of circuitry 4' are at count 0. After a number of frames, each stage $B_S$ stores an accumulated OR function of mismatches sampled at count S of each frame period.

When a HALT signal occurs at the output of AND 34, AND 53 is disabled and the information from stage $B_N$ is replaced by a "0" condition shifted into stage $B_{N-1}$ so that when the "0" condition is later shifted out of stage $B_O$, it can be OR-gated with new information at OR-gate 50. Also, in this case, the H additional clock pulses per frame of signal $\overline{SHC}$ causes the information in shift register 51 to be shifted H positions more than a complete round trip. The timing is such that the bits originating from the H rightmost stages of register 51 are OR-gated (except for the first bit) with H consecutive bits of signal MMFA at OR 50. The resultant H bits are replaced by "0"'s at AND 53. Then these H "0"'s are OR-gated at OR gate 50 with H bits of signal MMFA at H phases (bit positions within the frame period of the input information) not previously sampled. When the shifting stops, the resultant H bits reside in the H leftmost stages of register 51.

AND 34 has four inputs, signals SL and SM from decision circuit 16, the output from flip-flop $B_N$ and the HT signal from circuitry 4'. The output signals of decision circuit 16 are in a "1" condition when the voltage therein is below the decision level voltage and the mode flip-flop provides a "1" output on its "1" output. A "0" condition occurs in signal SL when the voltage in circuit 16 is above the decision level and a "0" condition is present for signal SM when the mode flip-flop is in its sense state. It should also be noted that when the OR function from OR 50 indicates a mismatch (binary "1") there will be a "1" at the output of flip-flop $B_N$. Thus, when any of the input signals to AND 34 are in the "0" binary condition there is no HALT signal produced and the counters of circuitry 4' will count normally without interruption. However, when all the inputs to AND 34 are in binary condition "1," an output will be produced which is a HALT pulse which when coupled through NOT 35 will inhibit AND 3 to block clock pulses from clock 1 and stop the counting action of the counters in circuitry 4'. This will result in a shift in the phase or timing of the timing signals produced by circuitry 4'. The amount of phase shift is dependent upon how many clock pulses are inhibited.

Figure 3:
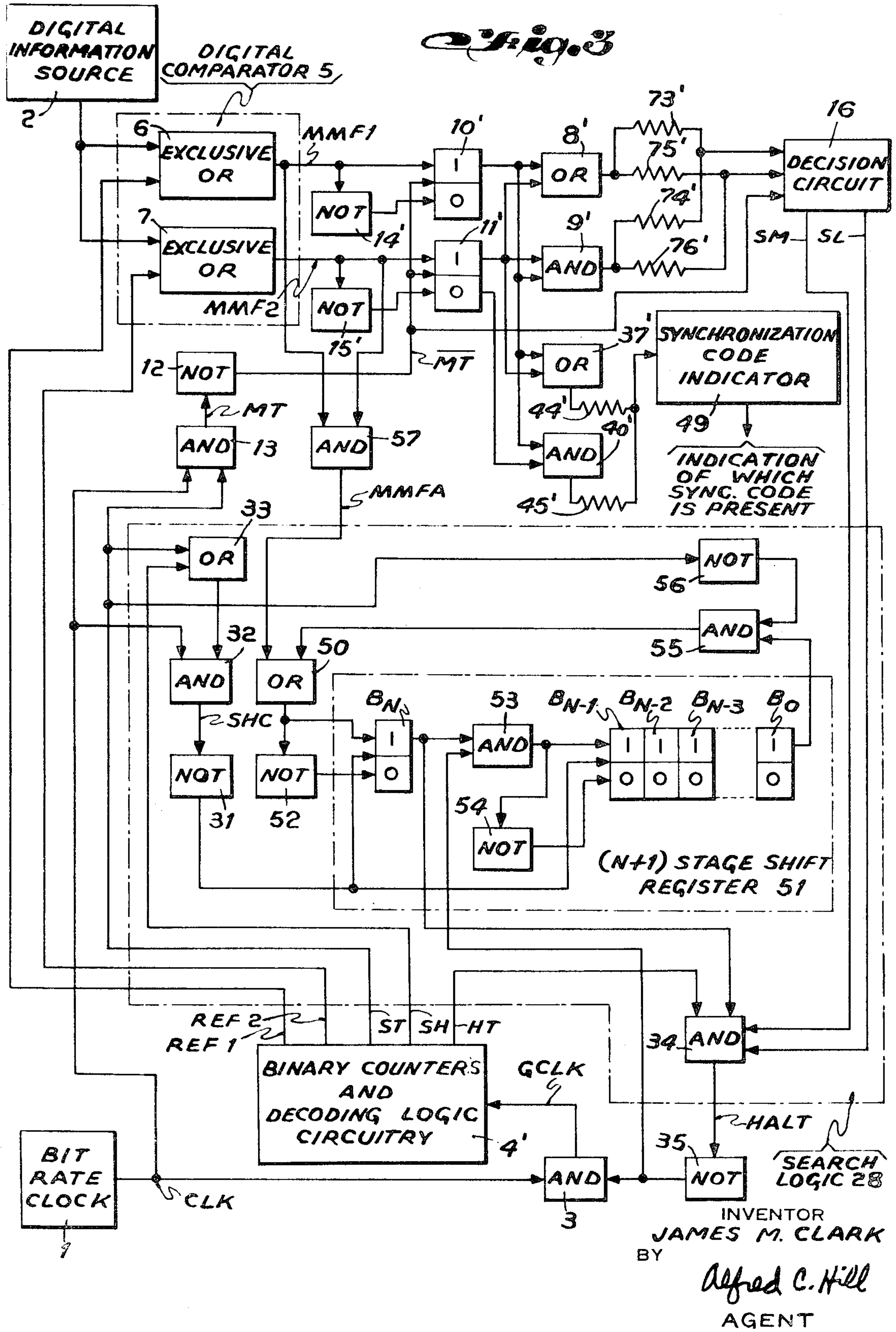
FIG. 3 is a block diagram of another embodiment of the frame synchronization system in accordance with the principles of this invention.

Referring to FIG. 3 there is illustrated therein another embodiment of the frame synchronization systems in accordance with the present invention which when compared to the embodiment of FIG. 1 results in a saving of equipment, namely, flip-flops 38 and 41, their associated NOT-gates 39 and 42 and NOT 36.

Circuitry 4' is identical to that of FIG. 2 as is the organization of search logic 28 as described hereinabove with respect to FIG. 2. The major reorganization of the embodiment of FIG. 3 is in connection with flip-flops 10 and 11, OR 8 and OR 9 and OR 37 and AND 40 of FIG. 1, and, in addition, the generation of the signal-driving search logic 28.

The MMF1 output of gate 6 is coupled directly to flip-flop 10' and through NOT 14' to flip-flop 10'. In addition, the MMF2 output from gate 7 is coupled directly to flip-flop 11' and through NOT 15' to flip-flop 11'. As in the case of FIG. 1, flip-flops 10' and 11' are triggered by the $\overline{MT}$ signal at the output of NOT 12 which also is used to trigger the mode flip-flop in decision circuit 16. Flip-flops 10' and 11' sample the MMF1 and MMF2 signals, respectively. The "1" output of flip-flop 10' is coupled to OR 8', OR 9', OR 37' and AND 40'. The "1" output of flip-flop 11' provides the other input for OR 8', AND 9' and OR 37' while the "0" output of flip-flop 11' provides the other input for AND 40'. It should be noted that the "0" output of a flip-flop is complementary to its "1" output and, thus, by coupling AND 40' to the "0" output of flip-flop 11' the function of NOT 36 in FIG. 1 has been provided. The OR function of OR 8' and the AND function of AND 9' are combined by resistors 73' and 74' and resistors 75' and 76' for coupling to decision circuit 16 which functions as described hereinabove with respect to FIG. 1 to produce the SM and SL output signals for application to AND 34. The OR function of OR 37' and the AND function of AND 40' are combined by resistors 44' and 45' for coupling to synchronization code indicator 49' which provides as described in connection with FIG. 1 an indication of which code pattern the synchronization system is synchronized to.

AND 57 is coupled to the output of gates 6 and 7 to provide an AND function of the MMF1 and MMF2 signals to drive search logic 28.

The circuit of FIG. 3 will operate as described hereinabove with respect to FIGS. 1 and 2 with like components being identified by the same reference character.

Figure 4:
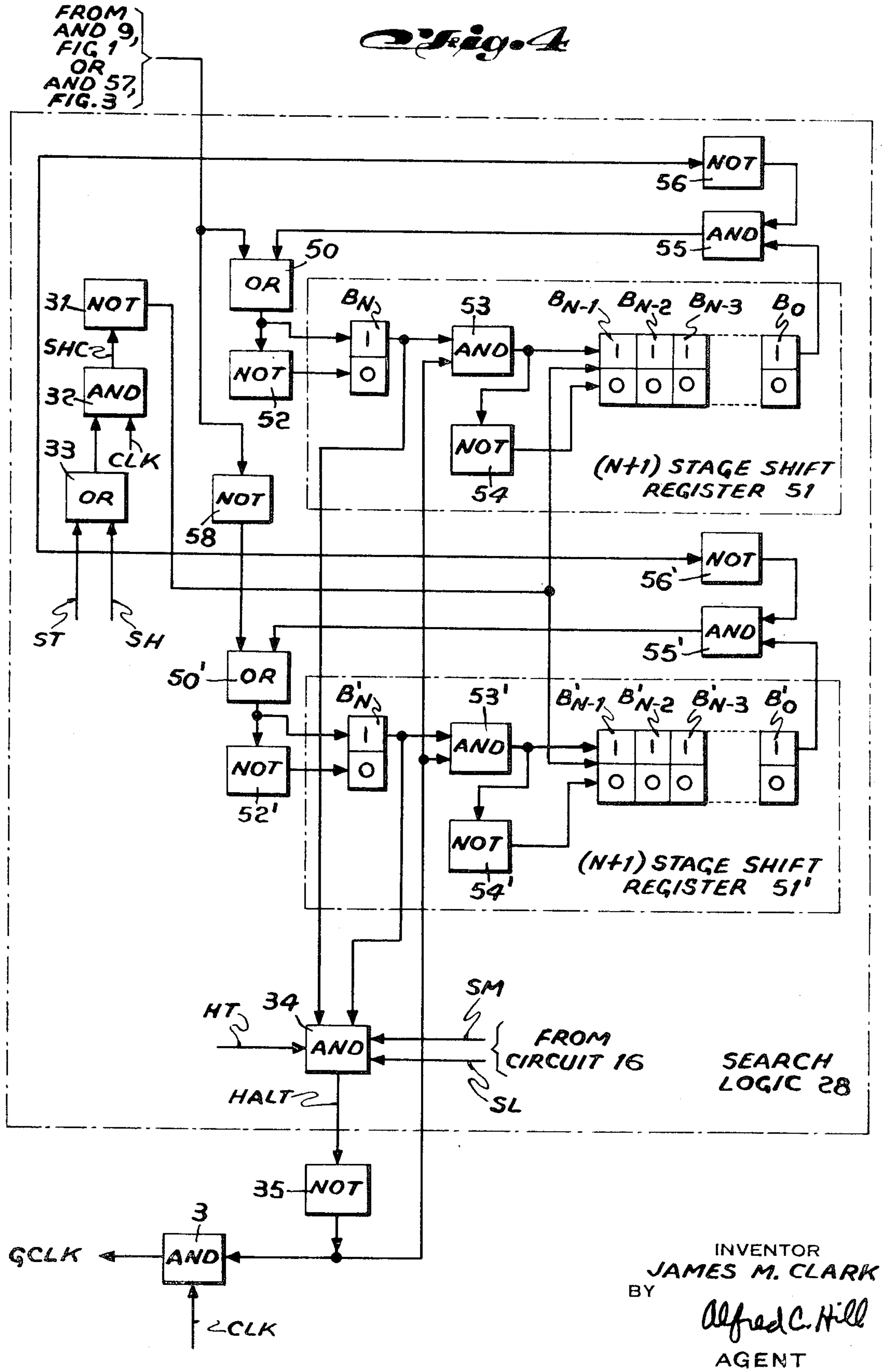
FIG. 4 is a block diagram of still another embodiment of the search logic that may be substituted for the search logic in FIGS. 1 and 3.

Referring to FIG. 4, there is illustrated therein another embodiment of search logic 28 that may be incorporated in the system of FIG. 1, or in the system of FIG. 3 and is the type of look-ahead search technique fully described in said third copending application employing two identical (N+1) stage shift registers. The functioning of the components associated with the two shift registers 51 and 51' is identical with that described hereinabove with respect to FIG. 2 and like components have been identified by the same reference characters with primes being applied to the reference characters of the components associated with shift register 51'. The MMFA output of AND 9, FIG. 1, or the MMFA of AND 57, FIG. 3 is coupled directly to OR 50 associated with shift register 51 and through NOT 58 to OR 50' associated with register 51'.

AND 34 as in previous embodiments generates the HALT signal when the synchronization system is in its search mode and this occurs when all the inputs to AND 34 are in a "1" condition. These inputs are signals SM and SL from decision circuit 16, the HT signal from circuitry 4' and the output of both the first stage $B_N$ AND $B'_N$ of shift registers 51 and 51', respectively.

The foregoing has, as mentioned at the beginning of the description, been concerned with two synchronization code patterns, one having a pattern 1,0,1,0 and the other code pattern being 1,1,0,0. These two synchronization code patterns are of the distributed type.

The circuitry of FIGS. 1, 2, 3 and 4 can also function with a pair of lumped-type synchronization code patterns. This is accomplished by substituting for digital comparator 5 the arrangement of FIG. 5 which includes a shift register 59 into which the digital information from source 2 is applied. If it is assumed that the first code pattern is 010010 and that the second code pattern is 101101 then all that is necessary is to provide two AND-gates 60 and 61 having their inputs connected to the appropriate outputs of the flip-flop stages of shift register 59. As illustrated AND 60 will examine the digital information for the lumped synchronization code pattern 010010 while AND 61 will examine the digital information for the lumped synchronization code pattern 101101. In addition, AND 60 will receive the reference synchronization signal REF 1 which is assumed to be a 4 kc. square wave and AND 61 will receive the synchronization reference signal REF 2 which is a complementary 4 kc. square wave signal. When AND 60 does find the first synchronization code pattern, it will provide a "1" output and when AND 61 finds the second synchronization code pattern, it will also provide a "1" output. The resultant signals are $\overline{MMF1}$ and $\overline{MMF2}$ which is complementary to MMF1 and MMF2 of FIGS. 1 and 3 where a binary "1" indicates a mismatch. To assure the same criteria for the two mismatch function signals, from AND 60 and 61 as is present in the embodiments of FIGS. 1 and 3, NOT 62 is coupled to the output of AND 60 to provide the MMF1 signal and NOT 63 is coupled to the output of AND 61 to provide the MMF2 signal. The remainder of the circuitry disclosed in any of the FIGS. 1–4 will operate as described hereinabove when the digital comparator 5 includes the arrangement as illustrated in FIG. 5 to provide a similar increase in acquisition of synchronization when compared with like systems responding to only a single synchronous code pattern as described in said first, second and third copending applications. In addition, it will be possible to also use the arrangement with the lumped synchronization code patterns for conveying intelligence by these two code patterns and also in a fault-locating system as previously described.

While I have described the principles of my invention in connection with specific apparatus, it is to be clearly understood that this description is made only by way of example.

I claim:

1. A frame synchronization system comprising:
a source of binary information signal having a given bit rate and containing either one of two different synchronization components;
first means to produce a plurality of timing signals;
second means coupled to said source and said first means to examine successive bits of said information signal to recognize either one of said synchronization components and produce at each examination a first resultant output signal and a second resultant output signal; and
third means coupled to said second means and said first means responsive to said first and second resultant output signals to provide a control signal for timing adjustment of said timing signals of said first means when said first and second resultant output signals indicate an out-of-synchronization condition until synchronization is achieved.

2. A system according to claim 1, wherein
said first means further produces
a first local binary synchronization reference signal for one of said synchronization components, and
a second local binary synchronization reference signal for the other of said synchronization components; and
said second means includes
digital comparison means coupled to said source and said first means to compare the binary condition of successive bits of said information signal and the binary condition of said first reference signal and produce said first resultant signal and to compare the binary condition of successive bits of said information signal and the binary condition of said second reference signal and produce said second resultant signal.

3. A system according to claim 2, wherein
said digital comparison means includes
two EXCLUSIVE OR circuits.

4. A system according to claim 2, wherein
said first means includes
a source of clock signal having said given rate,
binary counter means,
decoding means coupled to said counter means to produce said timing signals and said first and second reference signals, and
inhibit means coupled between said source of clock signal and said counter means and to said third means responsive to said control signal to carry out said timing adjustment.

5. A system according to claim 2, wherein
said third means includes
fourth means coupled to said digital comparator to determine when said system is not synchronized to either one of said first and second synchronization components; and
search logic coupled to said first means, said digital comparator and said fourth means to produce said control signal until synchronization is achieved.

6. A system according to claim 5, wherein
said fourth means includes
an OR gate coupled to said digital comparator to provide an OR function of said first and second resultant signals,
a first AND gate coupled to said digital comparator to provide a first AND function of said first and second resultant signals, and
fifth means having a decision level coupled in common to said OR gate and said first AND gate to produce a binary "1" output when the voltage therein resulting from said OR function and said first AND function is less than said decision level and a binary "0" output when the voltage therein resulting from said OR function and said first AND function is greater than said decision level.

7. A system according to claim 6, wherein
said search logic is coupled to said first AND gate.

8. A system according to claim 7, wherein
said search logic includes
a bistable means triggered at said given rate coupled to said first AND gate, and
sixth means coupled to said bistable means and said fifth means to produce said control signal when said fifth means produces a binary "1" output and simultaneously said bistable means produces a binary "1" output.

9. A system according to claim 7, wherein
said search logic includes
an (N+1) stage shift register to store N cumulative functions of previous samples of said first AND function, where N is equal to at least one,
a second OR gate having two inputs, one input being coupled to said first AND gate and the other input being coupled to the output of said shift register, and
sixth means coupled to said fifth means and the output of the first stage of said shift register to produce said control signal when said fifth means produces a binary "1" output and simultaneously the output signal of said first stage is a binary "1".

10. A system according to claim 7, wherein
said search logic includes
an invertor means coupled to said first AND gate to produce a complement of said first AND function,
a first (N+1) stage shift register to store N cumulative functions of previous samples of said first AND function, where N is equal to at least one,
a second (N+1) stage shift register to store N cumulative functions of previous samples of said complement of said first AND function,
a second OR gate having two inputs, one input being coupled to said first AND gate and the other input being coupled to the output of said first shift register,
a third OR gate having two inputs, one input being coupled to said inverter means and the other input being coupled to the output of said second shift register, and
sixth means coupled to said fifth means, the output of the first stage of said first shift register and the output of the first stage of said second shift register to produce said control signal when said fifth means produces a binary "1" output and simultaneously the output signal of each of said first stages of said first and second shift registers is a binary "1".

11. A system according to claim 6, further including
a second AND gate coupled to said digital comparator to provide a second AND function of said first and second resultant signals; and
wherein
said search logic is coupled to said second AND gate.

12. A system according to claim 11, wherein
said search logic includes
an (N+1) stage shift register to store N cumulative functions of previous samples of said second AND function, where N is equal to at least one,
a second OR gate having two inputs, one input being coupled to said second AND gate and the other input being coupled to the output of said shift register, and
sixth means coupled to said fifth means and the output of the first stage of said shift register to produce said control signal when said fifth means produces a binary "1" output and simultaneously the output signal of said first stage is a binary "1".

13. A system according to claim 11, wherein
said search logic includes
an inverter means coupled to said second AND gate to produce a complement of said second AND function,
a first (N+1) stage shift register to store N cumulative functions of previous samples of said second AND function, where N is equal to at least one, a second (N+1) stage shift register to store N cumulative functions of previous samples of said complement of said second AND function, a second OR gate having two inputs, one input being coupled to said second AND gate and the other input being coupled to the output of said first shift register, a third OR gate having two inputs, one input being coupled to said inverter means and the other input being coupled to the output of said second shift register, and sixth means coupled to said fifth means, the output of the first stage of said first shift register and the output of the first stage of said second shift register to produce said control signal when said fifth means produces a binary "1" output and simultaneously the output signal of each of said first stages of said first and second shift registers is a binary "1".

14. A system according to claim 1, further including means coupled to said second means to indicate which one of said synchronization components said system has synchronized to.

* * * * *